United States Patent
Attanasio

(10) Patent No.: US 9,253,273 B2
(45) Date of Patent: Feb. 2, 2016

(54) USER DATA AUTOMATIC LOOKUP IN LAWFUL INTERCEPTION

(75) Inventor: Francesco Attanasio, Roccapiemonte (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 246 days.

(21) Appl. No.: 13/697,907

(22) PCT Filed: Jun. 11, 2010

(86) PCT No.: PCT/SE2010/050655
§ 371 (c)(1),
(2), (4) Date: Dec. 4, 2012

(87) PCT Pub. No.: WO2011/155884
PCT Pub. Date: Dec. 15, 2011

(65) Prior Publication Data
US 2013/0080586 A1    Mar. 28, 2013

(51) Int. Cl.
| | |
|---|---|
| G06F 15/16 | (2006.01) |
| H04L 29/08 | (2006.01) |
| H04L 29/06 | (2006.01) |
| H04W 12/02 | (2009.01) |
| H04B 17/00 | (2015.01) |
| H04L 12/66 | (2006.01) |
| H04M 3/22 | (2006.01) |

(52) U.S. Cl.
CPC ............. *H04L 67/26* (2013.01); *H04L 63/06* (2013.01); *H04L 63/306* (2013.01); *H04W 12/02* (2013.01); *H04L 67/28* (2013.01); *H04M 3/2281* (2013.01)

(58) Field of Classification Search
CPC ....... H04L 63/06; H04L 63/306; H04L 67/26; H04L 67/28; H04M 3/2281
See application file for complete search history.

(56) References Cited

U.S. PATENT DOCUMENTS

| | | | | |
|---|---|---|---|---|
| 7,680,281 | B2 * | 3/2010 | Fiatal et al. | 380/255 |
| 7,969,968 | B2 * | 6/2011 | De Luca et al. | 370/352 |
| 8,340,292 | B1 * | 12/2012 | Schnellbacher et al. | 380/250 |
| 8,606,190 | B2 * | 12/2013 | Attanasio et al. | 455/67.11 |
| 2011/0299462 | A1 * | 12/2011 | Imbimbo et al. | 370/328 |

FOREIGN PATENT DOCUMENTS

| | | |
|---|---|---|
| WO | 2009038510 A1 | 3/2009 |
| WO | 2009103340 A1 | 8/2009 |
| WO | 2010019084 A1 | 2/2010 |

OTHER PUBLICATIONS

Sun Microsystems, "Communication, NEP and Media", Partner Solution Catalog, May 2009, http://www.pointsource.com/staff/docArchive/TelcoPartnerCatalog-051909-LR.pdf, pp. 132-133, 166-167.

* cited by examiner

*Primary Examiner* — Wen-Tai Lin

(74) *Attorney, Agent, or Firm* — Patent Portfolio Builders, PLLC

(57) ABSTRACT

The present invention relates to a method for providing a Law Enforcement Agency with user data related to a target subscriber. A Multiservice Proxy (30) is hereby acting as Intercepting Control Element (16). The method comprises the following steps: A request to intercept traffic data related to the target is received (40,41) to the Intercepting Control Element (16). User data related to the target subscriber for which traffic data has been requested is collected (44) in the Intercepting Control Element. The collected data is forwarded (45,46) to a Law Enforcement Management Function.

14 Claims, 4 Drawing Sheets

PRIOR ART

USER DATA AUTOMATIC LOOKUP IN LAWFUL INTERCEPTION

TECHNICAL FIELD

The present invention generally relates to systems, software and methods and, more particularly, to mechanisms and techniques to provide a Law Enforcement Agency with user data related to a target subscriber.

BACKGROUND

Lawful Interception of communications can be made based on knowledge of the identity of a party responsible for transmitting or receiving the communication. For example if a mobile telephone number of a criminal suspect is known, it is possible to intercept electronic communication sent from or received by the criminal suspect's mobile telephone. In governments around the world, various law enforcement agencies may have the right to authorize this interception in their respective jurisdictions.

FIG. 1 is part of the prior art and discloses an Intercept Mediation and Delivery Unit IMDU 1, also called Intercept Unit. The IMDU is a solution for monitoring of Interception Related Information IRI 2 and Content of Communication CC 3 for the same target. The different parts used for interception are disclosed in current Lawful Interception standards (see 3GPP TS 33.108 and 3GPP TS 33.107—Release 7). A Law Enforcement Monitoring Facility LEMF 20 is connected to three Mediation Functions MF 4, MF2 5 and MF3 6 respectively for ADMF 7, DF2 8, DF3 9 i.e. an Administration Function ADMF and two Delivery Functions DF2 and DF3. The Administration Function and the Delivery Functions are each one connected to the LEMF 20 via standardized handover interfaces HI1-HI3 10,11,12, and connected via interfaces X1_1 13, X2 14 and X3 15 to an Intercepting Control Element ICE 16 in a telecommunication system. Together with the delivery functions, the ADMF is used to hide from ICEs that there might be multiple activations by different Law Enforcement Agencies. Messages REQ 17 sent from LEMF 20 to ADMF via HI1 10 and from the ADMF to the network via the X1_1 interface 13 comprise identities of a target that is to be monitored. The Delivery Function DF2 8 receives Intercept Related Information IRI from the network via the X2 interface 14. DF2 is used to distribute the IRI to relevant Law Enforcement Agencies LEAs via the HI2 interface 11. The Delivery Function DF3 receives Content of Communication CC 3, i.e. speech and data, on X3 15 from the ICE. Requests are also sent from the ADMF to the Mediation Function MF2 in the DF2 on an interface X1_2 18 and to the Mediation Function MF3 in the DF3 on an interface X1_3 19. The requests sent on X1_3 are used for activation of Content of Communication, and to specify detailed handling options for intercepted CC. In Circuit Switching, DF3 9 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated.

In computer networks, a proxy server is a server (a computer system or an application program) that acts as an intermediary for requests from clients seeking resources from other servers. A client connects to the proxy server, requesting some service, such as a file, connection, web page, or other resource, available from a different server. Whenever an LI activation is triggered towards an Internet Proxy, complete user data information (i.e. personal user data (full name, birth date, home address, . . . ), organizational data (business category, department name, job . . . ), nationally-unique reference number, username, IMSI, IMEI, e-mail address, etc.) related to the target under interception is not available. Besides an operator needs several proxies (e.g. streaming proxy, browsing proxy, push proxy) to get detailed internet traffic data for LI purposes, this means high costs for operator for LI services offering and performance reduction.

SUMMARY

An aim of the invention is to overcome above identified limitations of the prior art. The invention focuses on adding Lawful Interception functionality to a Multi Service Proxy, i.e. to a proxy capable of replacing several other proxies in an operator network, and to introduce an automatic lookup for user data.

According to one aspect of the invention, a method is introduced to provide a Law Enforcement Agency with user data related to a target subscriber. A Multiservice Proxy is hereby acting as Intercepting Control Element. The method comprises steps like receiving to the Intercepting Control Element a request to intercept traffic data related to the target; and collecting in the Intercepting Control Element user data related to the target subscriber for which traffic data has been requested; and forwarding the collected data to a Law Enforcement Management Function.

According to another aspect of the invention, an arrangement is introduced to provide a Law Enforcement Agency with user data related to a target subscriber. A Multiservice Proxy is hereby acting as Intercepting Control Element. The arrangement comprises means to receive to the Intercepting Control Element a request to intercept traffic data related to the target; and means to collect in the Intercepting Control Element user data related to the target subscriber for which traffic data has been requested; and means to forward the collected data to a Law Enforcement Management Function.

According to a further aspect of the present invention, a node capable of replacing several proxies is acting as Intercepting Control Element for a Lawful Interception System and collects user data related to a target subscriber after having received a request for traffic data for the target.

According to yet a further aspect of the present invention, a node comprises means to send a request for data to an Intercepting Control Element and means to receive traffic data and/or user data.

According to further one aspect of the invention, Handover Interfaces between a Law Enforcement Management Function and an Intercept Mediation and Delivery Unit IMDU have been enhanced for the transportation of data requests related to a target subscriber and for transportation of traffic data and/or user data related to the target.

Some advantages are reported below:
  Possibility to use Multiservice Proxy for automatic user data retrieval other than internet traffic data, for LI purposes.
  Lawful Interception based on Multiservice Proxy provides a single vendor solution that can replace several proxies (e.g. streaming proxy, browsing proxy, push proxy) in the operator network, allowing cost reductions for LI services offering and at the same time performance improvements and maximized security.

The invention will now be described more in detail with the aid of preferred embodiments in connection with the enclosed drawings.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 2:
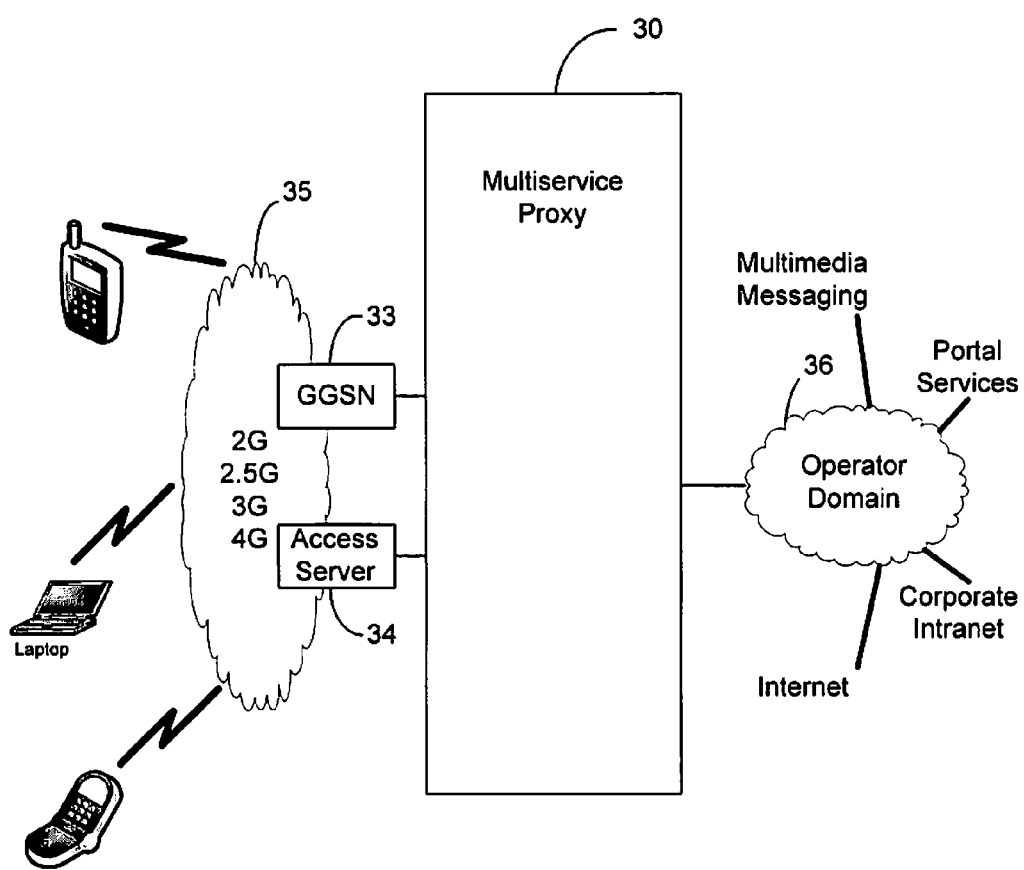
FIG. 2 belongs to prior art and is a block schematic illustration disclosing a Multiservice Proxy attached to mobile networks and to services in operator domain.

FIG. 2, that belongs to prior art, discloses a Multiservice Proxy 30. The Multiservice proxy can be deployed in a large variety of 2G, 2.5G, 3G and 4G mobile networks 35, including GSM, W-CDMA, TDMA, CDMA and LTE. The Multiservice Proxy 30 connects to a Gateway GPRS Support Node GGSN 33 for packet switched access and to an Access Server 34 for Circuit Switched Data access. Thanks to its central place in a Mobile Internet infrastructure, Multiservice Proxy 40 is the perfect enabler for providing services such as browsing, download, streaming, multimedia messaging and WAP push from operator domain 36. The Multiservice Proxy simplifies an Operator network by offering a single-vendor solution capable of replacing several other proxies in the Operator network, thus being a true multi-service proxy. This way it reduces both capital expenditure CAPEX and operating expense OPEX. In the example in FIG. 2 the operator domain comprises services such as Multimedia Messaging, Portal Services, Corporate Intranet and Internet. To support these services, Multiservice Proxy provides a full range of proxy services, for example, user identification, user access control, content optimization and forwarding of user and network information to the service providers.

Multiservice Proxy supports two alternative ways of handling user data:
  Using an external LDAP directory that contains user data
  Using an internal user database.

User data is fetched for example when a browsing/streaming session is established. This is done regardless of whether user identification and/or user authentication is/are activated. The auto provisioning of user data feature automatically creates and updates user records in the internal user database without operator intervention. The auto provisioning feature requires a separate feature license, and is activated in conjunction with identification or authentication activation. The purpose of auto provisioning is to create or update user records after successful identification or authentication.

Auto provisioning is performed once in each session. The following user record parameters, among others, are then stored or updated:
  MSISDN
  IMSI
  PPP username (if Multiservice Proxy is configured to store the PPP username)
  Personal User Data (including full name, birth date, home address, . . . )
  Organizational Data (including business category, department name, job, . . . )
  Push flag. This flag indicates if push is enabled for this user.
  Timestamp for record creation.
  Timestamp for last updated time.

Figure 1:
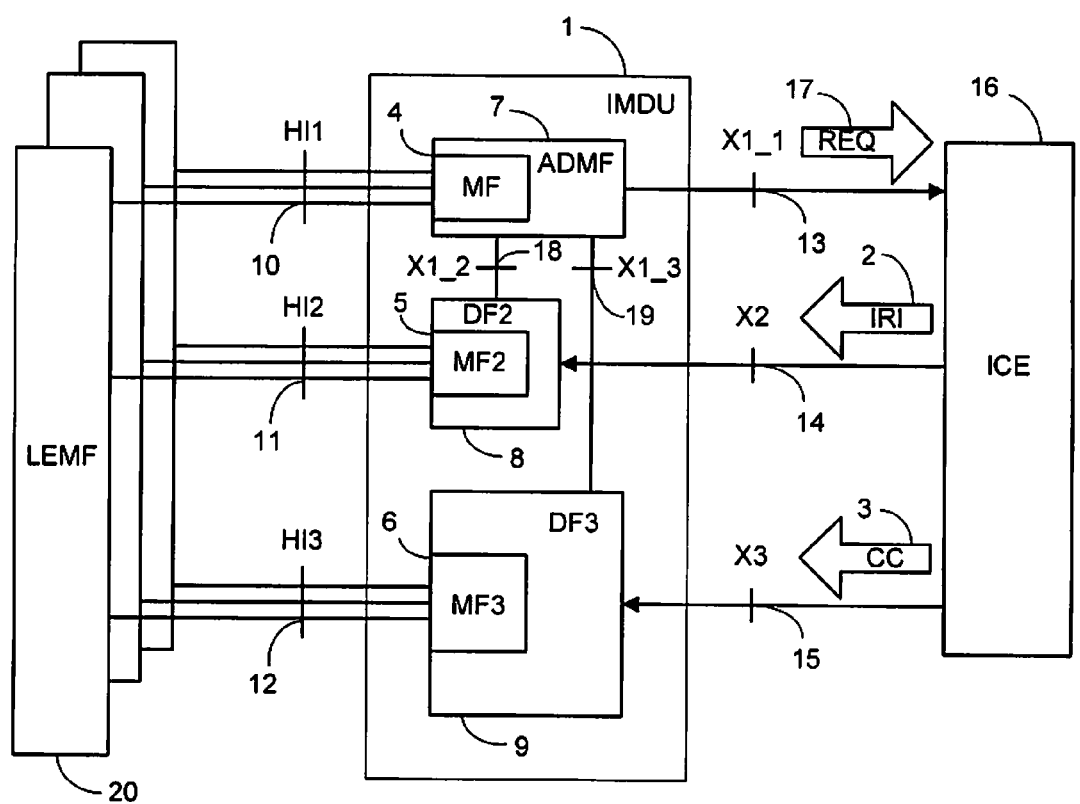
FIG. 1 is part of the prior art and discloses a block schematic illustration of an Intercept Mediation and Delivery Unit IMDU attached between an Intercepting Control Element ICE and a Law Enforcement Monitoring Facility LEMF.
Figure 3:
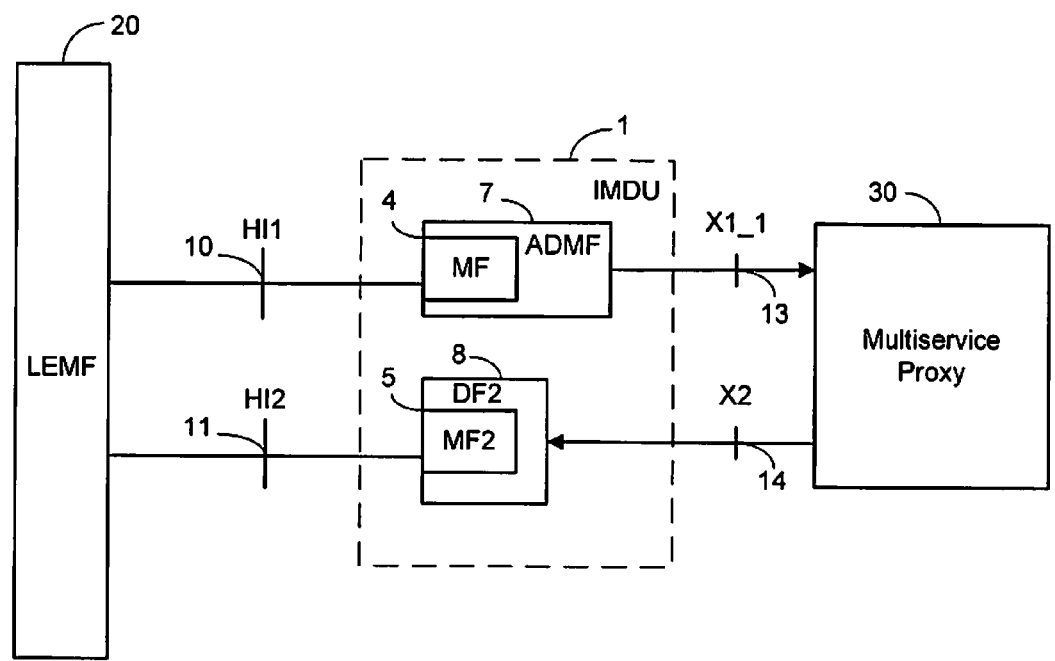
FIG. 3 discloses a Multiservice Proxy acting as Intercepting Control Element in a Lawful Interception configuration.

FIG. 3 discloses a Lawful Interception configuration. The figure shows the Intercept Mediation and Delivery Unit IMDU 1 comprising the earlier, in FIG. 1, explained ADMF 7, MF 4, DF2 8 and MF2 5. The IMDU is attached to the Law Enforcement Monitoring Facility LEMF 20 through the Handover Interfaces HI1 10 and HI2 11. The IMDU 1 is attached to the Multiservice Proxy 30 through the interfaces X1_1 13 and X2 14. This configuration has been explained earlier in the background part of this application. The earlier explained Multiservice Proxy 30 is acting as Intercepting Control Element.

Figure 4:
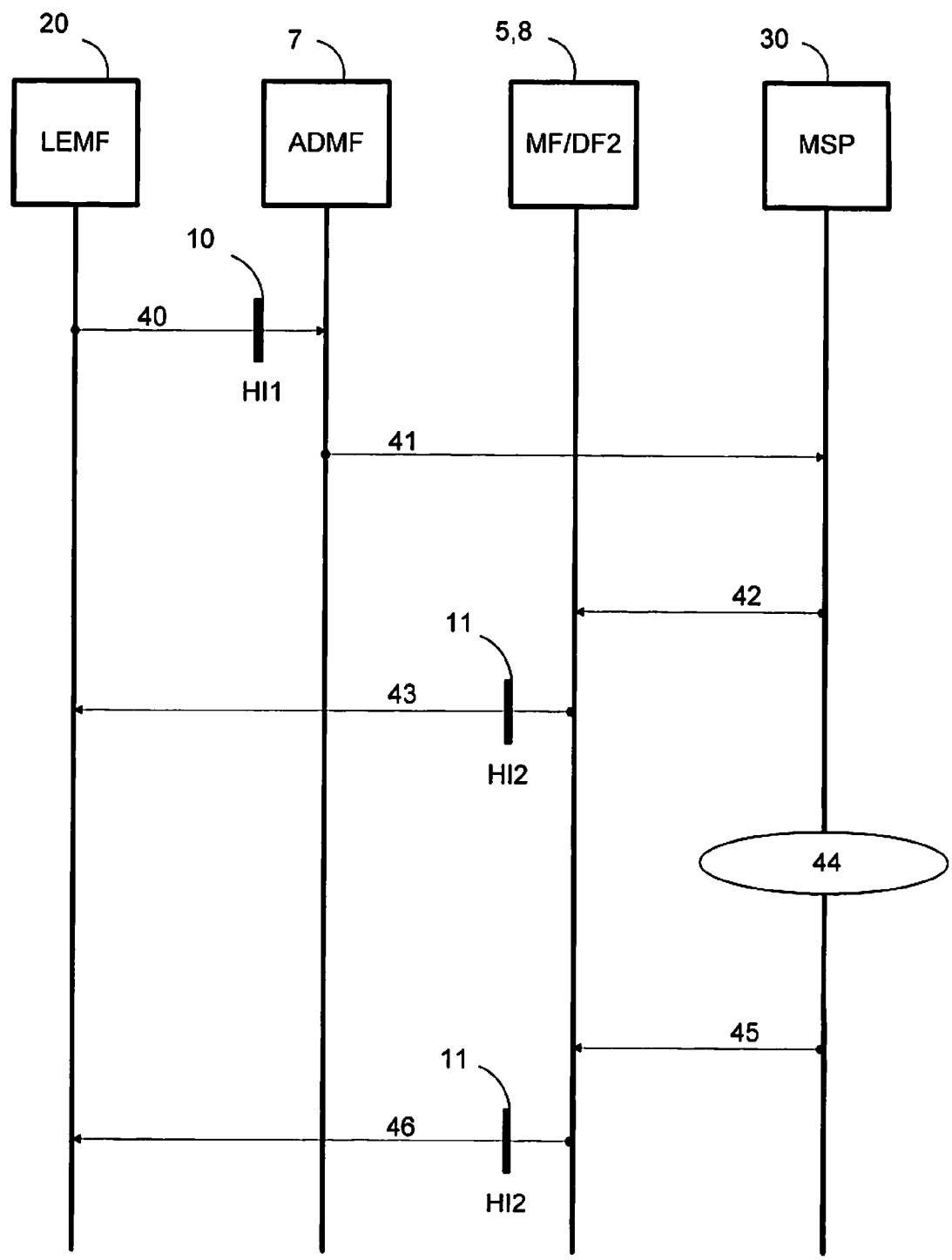
FIG. 4 discloses a signal sequence diagram representing collecting and forwarding of user data related to a target subscriber upon receiving, to a Multiservice Proxy, a request for traffic data related to the target subscriber.

A method according to a first embodiment of the invention will now be explained together with FIG. 4. The signalling points LEMF 20, ADMF 7, MF/DF 5,8, and MSP 30 have all been shown and briefly explained earlier together with previous figures. The method according to this embodiment will show interception in a Multiservice Proxy of a streaming session in which a target subscriber is involved. The result of the interception will beyond traffic data related to the streaming session i.e. so called raw IRI also according to the invention result in subscriber details (user data) associated with the identity target of the target under interception.

The Multiservice Proxy 30 is acting as Intercepting Control Element 16. The method comprises the following steps:
  A request to intercept traffic data is sent 40, 41 from the Law Enforcement Monitoring Facility LEMF 20 via the Administration Function 7 to the Multiservice Proxy 30. The Handover Interface HI1 10 is indicated in FIG. 4. According to the invention the Handover Interface HI1 has been enhanced to deliver requests related to for example streaming, browsing and wap traffic. In this example interception of a target subscriber when using a streaming service is requested. The target under monitoring is using RTSP streaming services (e.g. YouTube Mobile). The Multiservice Proxy includes an RTSP streaming proxy module, which provides the means to tap into RTSP traffic from streaming servers. In this embodiment, beyond the request to intercept traffic data, the LEMF 20 transfers 40, 41 a single warrant as part of the request to the Multiservice Proxy, with a "get all user information" option enabled. Consequently the Handover Interface HT1 has been enhanced according to the invention to deliver also this warrant.
  The Multiservice Proxy 30 intercepts and filters streaming session records and forwards 42 raw IRIS to the Mediation/delivery function MF/DF2 5,8. The following information can as an example be included in streaming specific fields in streaming session records:
    User agent identification, as presented in the RTSP header
    Stream URL
    Maximum/peak bit rate during the session in Kbit/s
    Average bit rate
    Transferred bytes during the session
    Number of RTCP Receiver Reports during the session.

The Mediation/Delivery Function MF/DF2 5,8 converts the intercepted traffic into the required standard format and sends 43 it through the HI2 interface 11 to a collection function running at the LEMF 20.

User data is fetched, in this example when the streaming session is established. As mentioned, the auto provisioning of user data feature automatically creates and updates user records in the internal user database. As a consequence to the received warrant "get all user information", all User details related to the monitored target identity is collected 44 in an IRI REPORT. The IRI REPORT may for example include data such as:

personal user data (full name, birth date, home address, . . . ), organizational data (business category, department name, job . . . ), nationally-unique reference number, username, MSISDN, IMSI, IMEI, e-mail address, etc.).

The IRI REPORT, containing all User details related to the monitored target identity is sent 45 from the Multiservice Proxy 30 towards the Mediation/Delivery Function MF/DF2 5,8.

The IRI REPORT, containing all User details related to the monitored target identity is sent 46 from MF/DF2 to the Law Enforcement Monitoring Facility LEMF 20. The MF/DF2 hereby handovers to the LEMF a mediated IRI report, including all user data available, linked to the target id.

In a second embodiment, interception of a target subscriber when using a browsing service is requested. The Multiservice Proxy includes a browsing proxy module, which provides the means to tap browsing data. To be noted, in this second embodiment, is that whenever a warrant related to web browsing service (in this example) is sent to the Multiservice Proxy, the option get all user information is enabled by default.

The Multiservice Proxy intercepts and filters browsing records and forwards raw IRIs to the Lawful interception Mediation System. The following information can be included in browsing specific fields related to browsing records:

| FIELD | DESCRIPTION |
| --- | --- |
| Bearer | Bearer service used, SMS or UDP/IP. |
| Destination URL | URL from which content was retrieved. |
| Content size from terminal | Volume of data received from the terminal. Configurable to include headers. |
| Content size to terminal | Volume of data sent to the terminal. Configurable to include headers. |
| Content size from server | Volume of data received from the server. Configurable to include headers. |
| Content size to server | Volume of data sent to the server. Configurable to include headers. |
| Url duration time | The time, in seconds, that the user browsed the URL. |
| HTTP Method | HTTP method used. This field is empty if the HTTP method is not available. |
| Session Id | Id of the session to which the pull request belongs |
| Network Access Type | Network access type, for example, GPRS IP, GSM CSD, SMS, UMTS. Derived from the NAS-IP-address. |

-continued

| FIELD | DESCRIPTION |
| --- | --- |
| NAS IP-address | IP address of the Network Access Server. |
| NAS identifier | Identifier of the Network Access Server. |
| APN | Access Point Name. |
| SGSN IP Address | IP address of the Serving GPRS Support Node. |
| E.164 of Access server | CSD Internet Access Server. |
| Destination IP address | IP address derived from Destination URL. |

Like in the first embodiment, an IRI REPORT, containing all User details related to the monitored target identity is sent from the Multiservice Proxy towards the MF/DF2. The report includes as an example: Source IP address allocated to the terminal, IMSI, MSISDN, IMEI. As said, the IRI REPORT is in this embodiment created and sent by default when a request for browsing traffic data related to the target has been received by the Multiservice Proxy 30.

To summarize, an enhancement of the handover interfaces is performed, allowing investigators to get traffic data for a target subscriber and relevant user data related to the target for which traffic data is requested. When a warrant is triggered with "get all user Information" option enabled for if the warrant is activated with get all user information enabled by default), an IRI Report containing all User details related to the monitored target identity is sent from the Multiservice Proxy towards the LEMF. The automatic lookup warrants towards User Information can allow LEA investigators to get all user information related to the target under interception. For instance when traffic IRI provide a MSISDN, it shall be possible to add personal user data by default to the output, related to the MSISDN. LI Multiservice Proxy can replace a proxy from another vendor, as any existing protocol, which the other vendor proxy used to communicate with a node in the Operator's network, can be implemented as a new proxy module.

A system that can be used to put the invention into practice is schematically shown in FIG. 3. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention is not limited to the above described and in the drawings shown embodiments but can be modified within the scope of the enclosed claims.

The invention claimed is:

1. A computer-implemented method for providing a Law Enforcement Agency with user data related to a target subscriber, the method comprising:
    receiving a request to intercept traffic data related to the target subscriber, the request comprising a single warrant requesting lookup of all user data related to the target subscriber;
    collecting user data related to the target subscriber for which traffic data has been requested, the user data being collected from an external directory that contains user data or from an internal user database; and
    forwarding the collected user data to a Law Enforcement Management Function;
    wherein the receiving, collecting, and forwarding are implemented by a Multiservice Proxy acting as an Intercepting Control Element for automatically looking up all of the user data available from different proxies including a browsing proxy, streaming proxy, and push proxy.

2. The computer-implemented method of claim 1, wherein the user data related to the target subscriber is collected by default in a report upon receiving the request to intercept traffic data.

3. The computer-implemented method of claim 2 wherein the user data related to the target subscriber is collected in a report upon receiving the single warrant.

4. The computer-implemented method of claim 1, wherein the request is sent through a first Handover Interface located between the Law Enforcement Management Function and an Administration Function.

5. The computer-implemented method of claim 1, wherein forwarding the collected data comprises forwarding the collected data from the Intercepting Control Element to the Law Enforcement Management Function via a second Handover Interface between a Mediation/Delivery Function and the Law Enforcement Management Function.

6. The computer-implemented method of claim 5, wherein the second Handover Interface is configured to forward at least one of the following user data:
    MSISDN;
    IMSI;
    PPP username;
    Personal User Data;
    Organizational Data;
    a Push flag indicating if push is enabled for the targeted subscriber;
    a Timestamp for record creation;
    a Timestamp for last updated time.

7. The computer-implemented method of claim 1, further comprising forwarding the requested traffic data from the Intercepting Control Element to the Law Enforcement Management Function via the Mediation/Delivery Function.

8. The method of claim 1, wherein the Multiservice Proxy acts as at least two of a streaming proxy, a browsing proxy, and a push proxy.

9. A Multiservice Proxy that is part of an arrangement configured to provide a Law Enforcement Agency with user data related to a target subscriber, the Multiservice Proxy comprising electronic circuits configured to:
    receive a request to intercept traffic data related to the target, the request comprising a single warrant requesting lookup of all user data related to the target subscriber;
    collect user data related to the target subscriber for which traffic data has been requested, the user data being collected from an external directory that contains user data or from an internal user database; and
    forward the collected user data to a Law Enforcement Management Function;
    wherein the Multiservice Proxy acts as an Intercepting Control Element for automatically looking up all of the user data available from different proxies including a browsing proxy, streaming proxy, and push proxy.

10. The Multiservice proxy of claim 9, wherein the electronic circuits are configured to receive the request to intercept traffic data from a first Handover Interface located between the Law Enforcement Management Function and an Administration Function.

11. The Multiservice proxy of claim 9, wherein the electronic circuits are configured to forward the requested traffic data from the Intercepting Control Element to the Law Enforcement Management Function via a second Handover Interface operatively disposed between a Mediation/Delivery Function and the Law Enforcement Management Function.

12. The Multiservice proxy of claim 9, wherein the electronic circuits are further configured to forward the requested traffic data from the Intercepting Control Element to the Law Enforcement Management Function via a Mediation/Delivery Function.

13. The arrangement of claim 9, wherein the Multiservice Proxy acts as at least two of a streaming proxy, a browsing proxy, and a push proxy.

14. A computer program product stored in a non-transitory computer readable medium for providing a Law Enforcement Agency with user data related to a target subscriber, the computer program product comprising software instructions which, when run on a processor of a telecommunication network, causes the processor to:
    receive a request to intercept traffic data related to the target subscriber, the request comprising a single warrant requesting lookup of all user data related to the target subscriber;
    collect user data related to the target subscriber for which traffic data has been requested, the user data being collected from an external directory that contains user data or from an internal user database; and
    forward the collected user data to a Law Enforcement Management Function;
    wherein the processor is part of a Multiservice Proxy acting as Intercepting Control Element for automatically looking up all of the user data available from different proxies including a browsing proxy, streaming proxy, and push proxy.

* * * * *